(12) United States Patent
Humenik (10) Patent No.: US 12,005,534 B2
(45) Date of Patent: Jun. 11, 2024

(54) INSULATED ELECTRODE COVER FOR A WELDING ELECTRODE HOLDER

(75) Inventor: Jeff Humenik, Manhattan, IL (US)

(73) Assignee: Constellation Energy Generation, LLC, Kennett Square, PA (US)

(*) Notice: Subject to any disclaimer, the term of this patent is extended or adjusted under 35 U.S.C. 154(b) by 760 days.

(21) Appl. No.: 13/344,319

(22) Filed: Jan. 5, 2012

(65) Prior Publication Data

US 2013/0119041 A1    May 16, 2013

Related U.S. Application Data

(60) Provisional application No. 61/429,996, filed on Jan. 5, 2011.

(51) Int. Cl.
     *B23K 9/28*      (2006.01)
     *H05B 7/101*      (2006.01)

(52) U.S. Cl.
     CPC ............... *B23K 9/28* (2013.01); *H05B 7/101* (2013.01)

(58) Field of Classification Search
     CPC ...... B23K 9/28; B23K 9/0008; B23K 35/404; B23K 35/0261; B23K 9/282; H05B 7/101; H01R 11/24; Y10T 24/44538; Y10T 24/44564
     USPC .......... 219/138, 70, 130; 439/437, 388, 822; 24/518, 521
     See application file for complete search history.

(56) References Cited

U.S. PATENT DOCUMENTS

| | | | | |
|---|---|---|---|---|
| 1,345,817 A | * | 7/1920 | Williams | B23K 9/282 219/138 |
| 1,419,744 A | * | 6/1922 | Mattice | B23K 9/282 219/138 |
| 1,472,581 A | * | 10/1923 | Britt | B23K 9/282 219/144 |
| 1,518,084 A | * | 12/1924 | Lovelace | B23K 9/282 219/143 |

(Continued)

FOREIGN PATENT DOCUMENTS

WO      2012/094494 A1      7/2012

OTHER PUBLICATIONS

International Search Report and Written Opinion for PCT Application No. PCT/US2012/020330, filed Jan. 5, 2012 (Publication No. WO2012/094494, published Jul. 12, 2012), issued May 2, 2012 (10 pages).

(Continued)

*Primary Examiner* — Eric S Stapleton
(74) *Attorney, Agent, or Firm* — Ballard Spahr LLP (57) ABSTRACT

An insulated electrode cover for a welding electrode holder is provided that can reduce or eliminate inadvertent electrical arcing between the electrode holder and adjacent objects. The insulated electrode cover comprises a cap configured to couple to the welding electrode holder. The cap is positioned on the welding electrode holder to overlie selective portions of the jaws of the welding electrode holder so that, when a welding rod is clamped in the jaws of the electrode holder and the electrode is energized, no electrically conductive portion on the exterior surfaces of the jaws is exposed. This can greatly increase the safety of the welding electrode by reducing or eliminating inadvertent shocks and/or fires that can be created by conventional welding electrode holders.

11 Claims, 10 Drawing Sheets

(56) References Cited

U.S. PATENT DOCUMENTS

| | | | | |
|---|---|---|---|---|
| 1,546,410 A * | 7/1925 | Schneider | B23K 9/282 | 219/141 |
| 1,552,244 A * | 9/1925 | Thomas | B23K 9/282 | 219/138 |
| 1,599,259 A * | 9/1926 | Welch | B23K 9/282 | 219/142 |
| 1,604,069 A * | 10/1926 | Owen | B23K 9/282 | 219/143 |
| 1,682,523 A * | 8/1928 | James | B23K 9/282 | 219/143 |
| 1,723,760 A * | 8/1929 | Bowers | B23K 9/282 | 219/141 |
| 1,732,441 A * | 10/1929 | Griffiths | B23K 9/282 | 219/138 |
| 1,761,728 A * | 6/1930 | Heckman | B23K 9/282 | 219/141 |
| 1,825,314 A * | 9/1931 | Heckman | B23K 9/282 | 16/431 |
| 1,851,039 A * | 3/1932 | Fausek | B23K 9/282 | 219/138 |
| 1,883,807 A * | 10/1932 | Mcintire | B23K 9/282 | 200/505 |
| 1,895,573 A * | 1/1933 | Kiser | B23K 9/282 | 219/143 |
| 1,935,449 A * | 11/1933 | Inman | B23K 9/282 | 219/144 |
| 1,936,408 A * | 11/1933 | Persson | B23K 9/282 | 219/138 |
| 1,979,528 A * | 11/1934 | Bruce | B23K 9/282 | 219/138 |
| 2,003,196 A * | 5/1935 | Jackson | B23K 9/282 | 219/138 |
| 2,060,606 A * | 11/1936 | Bowius | B23K 9/282 | 219/143 |
| 2,064,908 A * | 12/1936 | Gruell | B23K 9/282 | 219/144 |
| 2,067,995 A * | 1/1937 | Varner | B23K 9/282 | 219/144 |
| 2,077,468 A * | 4/1937 | Fausek | B23K 9/282 | 219/141 |
| 2,104,750 A * | 1/1938 | Jones | B23K 9/282 | 219/138 |
| RE20,808 E * | 7/1938 | Churchward | B23K 9/282 | 219/141 |
| 2,124,283 A * | 7/1938 | Bevard | B23K 9/282 | 219/141 |
| 2,143,619 A * | 1/1939 | Bourque | B23K 9/282 | 219/141 |
| 2,145,699 A * | 1/1939 | Townsend | B23K 9/282 | 219/138 |
| 2,148,095 A * | 2/1939 | Yettner | B23K 9/282 | 219/141 |
| 2,151,552 A * | 3/1939 | Jandos | B23K 9/282 | 219/138 |
| 2,151,871 A * | 3/1939 | Riemenschneider | B23K 9/282 | 219/144 |
| 2,162,112 A * | 6/1939 | Nickels | B23K 9/282 | 219/138 |
| 2,162,633 A * | 6/1939 | Miller | B23K 9/282 | 219/142 |
| 2,175,871 A * | 10/1939 | Bourne | B23K 9/282 | 219/142 |
| 2,186,158 A * | 1/1940 | Weeks | B23K 9/282 | 219/138 |
| 2,196,565 A * | 4/1940 | Pishioneri | B23K 9/282 | 219/141 |
| 2,232,213 A * | 2/1941 | Churchward | B23K 9/282 | 219/141 |
| 2,233,618 A * | 3/1941 | Leach | B23K 9/282 | 219/142 |
| 2,236,372 A * | 3/1941 | Kotchi | B23K 9/282 | 219/138 |
| 2,236,849 A * | 4/1941 | Hackmeyer | B23K 9/282 | 200/293.1 |
| 2,251,779 A * | 8/1941 | Bourque | B23K 9/282 | 219/141 |
| 2,265,135 A * | 12/1941 | Hackmeyer | B23K 9/282 | 200/505 |
| 2,270,724 A * | 1/1942 | Brazitis | B23K 9/282 | 219/138 |
| 2,283,162 A * | 5/1942 | Bourque | B23K 9/282 | 219/141 |
| 2,294,321 A * | 8/1942 | Schulfer, Jr. | B23K 9/282 | 219/138 |
| 2,300,203 A * | 10/1942 | Campbell | B23K 9/0017 | 219/139 |
| 2,301,107 A * | 11/1942 | Churchward | B23K 9/282 | 219/141 |
| 2,301,108 A * | 11/1942 | Churchward | B23K 9/282 | 219/141 |
| 2,305,188 A * | 12/1942 | Nowicke | B23K 9/282 | 219/141 |
| 2,317,780 A * | 4/1943 | Laskey | B23K 9/282 | 219/143 |
| 2,322,077 A * | 6/1943 | Wells | B23K 9/282 | 219/142 |
| 2,324,924 A * | 7/1943 | Hall | B23K 9/282 | 219/144 |
| 2,325,926 A * | 8/1943 | Weed | B23K 9/282 | 219/142 |
| 2,327,290 A * | 8/1943 | Rice | B23K 9/282 | 219/138 |
| 2,327,303 A * | 8/1943 | Donnelly | B23K 9/282 | 219/141 |
| 2,336,712 A * | 12/1943 | Bourque | B23K 9/282 | 219/144 |
| 2,338,000 A * | 12/1943 | Landis | B23K 9/282 | 219/138 |
| 2,338,913 A * | 1/1944 | Esposito | B23K 9/282 | 219/138 |
| 2,340,496 A * | 2/1944 | Sweet | B23K 9/282 | 219/143 |
| 2,347,598 A * | 4/1944 | Foley | B23K 9/282 | 219/144 |
| 2,347,880 A * | 5/1944 | Budd | B23K 9/282 | 219/138 |
| 2,348,270 A * | 5/1944 | Van Dyke | B23K 9/282 | 219/141 |
| 2,350,614 A * | 6/1944 | Jackson | B23K 9/282 | 219/138 |
| 2,351,852 A * | 6/1944 | Gosch | B23K 9/282 | 219/141 |
| 2,357,457 A * | 9/1944 | Churchward | B23K 9/282 | 219/138 |
| 2,357,844 A * | 9/1944 | Nellis | B23K 9/282 | 219/144 |
| 2,358,220 A * | 9/1944 | Donnelly, Jr. | B23K 9/282 | 219/138 |
| 2,358,800 A * | 9/1944 | Fuller | B23K 9/282 | 219/144 |
| 2,360,016 A * | 10/1944 | Roland | B23K 9/282 | 219/141 |
| 2,364,507 A * | 12/1944 | Bernard | B23K 9/282 | 219/142 |
| 2,364,508 A * | 12/1944 | Bernard | B23K 9/282 | 219/142 |
| 2,371,306 A * | 3/1945 | Miller | B23K 9/282 | 219/142 |
| 2,371,649 A * | 3/1945 | Radabaugh | B23K 9/282 | 219/144 |
| 2,372,113 A * | 3/1945 | Opgenorth | B23K 9/282 | 219/144 |
| 2,373,605 A * | 4/1945 | Shellabarger | B23K 9/282 | 219/138 |
| 2,375,656 A * | 5/1945 | Jackson | B23K 9/282 | 219/138 |
| 2,375,836 A * | 5/1945 | Bourque | B23K 9/282 | 219/144 |

(56) References Cited

U.S. PATENT DOCUMENTS

| | | | | | |
|---|---|---|---|---|---|
| 2,377,047 A * | 5/1945 | Siemers | B23K 9/282 | | 219/138 |
| 2,379,515 A * | 7/1945 | Gallo | B23K 9/282 | | 219/141 |
| 2,379,777 A * | 7/1945 | Zeilstra | B23K 9/282 | | 219/137 R |
| 2,384,999 A * | 9/1945 | Heinrich | B23K 9/282 | | 219/138 |
| 2,386,399 A * | 10/1945 | Jackson | B23K 9/282 | | 219/138 |
| 2,387,464 A * | 10/1945 | Palmgren | B23K 9/282 | | 219/142 |
| 2,389,938 A * | 11/1945 | Smith | B23K 9/28 | | 219/144 |
| 2,390,149 A * | 12/1945 | Hopper | B23K 9/28 | | 219/137 R |
| 2,390,997 A * | 12/1945 | Fuller | B23K 9/282 | | 219/144 |
| 2,393,742 A * | 1/1946 | Brazitis | B23K 9/282 | | 219/138 |
| 2,394,204 A * | 2/1946 | Randall | B23K 9/282 | | 219/144 |
| 2,395,228 A * | 2/1946 | Lininger | B23K 9/282 | | 219/144 |
| 2,400,285 A * | 5/1946 | Buck | B23K 9/282 | | 219/144 |
| 2,401,383 A * | 6/1946 | Wilson | B23K 9/282 | | 219/142 |
| 2,401,523 A * | 6/1946 | Townsend | B23K 9/282 | | 219/138 |
| 2,402,535 A * | 6/1946 | Cushman | B23K 9/282 | | 219/138 |
| 2,405,536 A * | 8/1946 | Wells | B23K 9/282 | | 219/142 |
| 2,407,836 A * | 9/1946 | Ketelbey | B23K 9/282 | | 219/142 |
| 2,411,980 A * | 12/1946 | Ringwald | B23K 9/282 | | 219/138 |
| 2,412,309 A * | 12/1946 | Wells | B23K 9/282 | | 219/142 |
| 2,412,492 A * | 12/1946 | Brazitis | B23K 9/282 | | 219/138 |
| 2,415,671 A * | 2/1947 | Camilleri | B23K 9/282 | | 219/138 |
| 2,416,841 A * | 3/1947 | Nowicke | B23K 9/282 | | 219/141 |
| 2,416,872 A * | 3/1947 | Garibay | B23K 9/282 | | 219/138 |
| 2,419,789 A * | 4/1947 | Paulson | B23K 9/282 | | 219/144 |
| 2,421,723 A * | 6/1947 | Smout | B23K 9/282 | | 219/138 |
| 2,423,758 A * | 7/1947 | Donnelly | B23K 9/282 | | 219/142 |
| 2,424,437 A * | 7/1947 | Dent | B23K 9/282 | | 16/431 |
| 2,427,002 A * | 9/1947 | Jepson | B23K 9/282 | | 219/144 |
| 2,428,065 A * | 9/1947 | Cockrill | B23K 9/282 | | 219/138 |
| 2,428,138 A * | 9/1947 | Blakemore | B23K 9/28 | | 219/138 |
| 2,433,018 A * | 12/1947 | Ronay | B23K 9/0061 | | 219/70 |
| 2,433,355 A * | 12/1947 | French, Sr. | B23K 9/282 | | 219/144 |
| 2,434,023 A * | 1/1948 | Udesen | B23K 9/282 | | 219/144 |
| 2,437,652 A * | 3/1948 | Reddick | B23K 9/282 | | 219/138 |
| 2,441,589 A * | 5/1948 | Nichols | B23K 9/282 | | 219/144 |
| 2,442,409 A * | 6/1948 | Hallett | B23K 9/123 | | 314/129 |
| 2,443,467 A * | 6/1948 | Lloyd | B23K 9/282 | | 219/138 |
| 2,444,798 A * | 7/1948 | Wilson | B23K 9/282 | | 219/138 |
| 2,448,994 A * | 9/1948 | McClary | B23K 9/282 | | 219/144 |
| 2,452,199 A * | 10/1948 | King | B23K 9/282 | | 219/144 |
| 2,452,876 A * | 11/1948 | Shaw | B23K 9/282 | | 219/142 |
| 2,453,244 A * | 11/1948 | Matson | B23K 9/282 | | 219/138 |
| 2,453,648 A * | 11/1948 | Wagner | B23K 9/282 | | 219/138 |
| 2,454,617 A * | 11/1948 | Siemers | B23K 9/282 | | 219/143 |
| 2,455,108 A * | 11/1948 | Beauregard | B23K 9/282 | | 219/138 |
| 2,457,193 A * | 12/1948 | Wynn | B23K 9/282 | | 219/142 |
| 2,458,723 A * | 1/1949 | Nilsson | B23K 9/282 | | 219/143 |
| 2,468,873 A * | 5/1949 | Harvey | B23K 9/282 | | 200/532 |
| 2,472,177 A * | 6/1949 | Taber | B23K 9/282 | | 219/138 |
| 2,477,207 A * | 7/1949 | Rinehart | B23K 9/282 | | 219/138 |
| 2,479,127 A * | 8/1949 | Loucks | B23K 9/282 | | 219/144 |
| 2,481,952 A * | 9/1949 | Schwartz | B23K 9/282 | | 219/138 |
| 2,485,360 A * | 10/1949 | Colinet | B23K 9/282 | | 219/144 |
| 2,519,877 A * | 8/1950 | Bevard | B23K 9/282 | | 219/141 |
| 2,522,810 A * | 9/1950 | Bailey | H01R 4/308 | | 439/729 |
| 2,534,526 A * | 12/1950 | Murdock | B23K 9/282 | | 219/141 |
| 2,540,204 A * | 2/1951 | Holslag | B23K 9/282 | | 219/141 |
| 2,609,471 A * | 9/1952 | Bergeson | B23K 9/282 | | 219/142 |
| 2,634,356 A * | 4/1953 | Candy | B23K 9/282 | | 219/138 |
| 2,658,133 A * | 11/1953 | Barrow | B23K 9/282 | | 219/138 |
| 2,681,969 A * | 6/1954 | Burke | B23K 9/282 | | 219/138 |
| 2,692,933 A * | 10/1954 | Cornell | B23K 9/282 | | 200/16 R |
| 2,722,588 A * | 11/1955 | Wagner | B23K 9/282 | | 219/138 |
| 2,723,332 A * | 11/1955 | Peterson | B23K 9/282 | | 219/144 |
| 2,723,333 A * | 11/1955 | Eversole | B23K 9/282 | | 219/138 |
| 2,725,449 A * | 11/1955 | Gosch | B23K 9/282 | | 219/138 |
| 2,728,838 A * | 12/1955 | Barnes | B23K 9/282 | | 219/138 |
| 2,758,185 A * | 8/1956 | Bergeson | B23K 9/282 | | 219/143 |
| 2,764,669 A * | 9/1956 | Jones | B23K 9/282 | | 219/138 |
| 2,783,362 A * | 2/1957 | Hassler | B23K 9/282 | | 219/138 |
| 2,799,771 A * | 7/1957 | Donnelly, Jr. | B23K 9/282 | | 219/138 |
| 2,806,126 A * | 9/1957 | Gladen | B23K 9/282 | | 219/137 R |
| 2,818,495 A * | 12/1957 | Zoethout | B23K 9/282 | | 219/138 |

(56) References Cited

U.S. PATENT DOCUMENTS

| | | | | |
|---|---|---|---|---|
| 2,823,298 | A * | 2/1958 | Carrier | B23K 9/282<br>219/138 |
| 2,846,564 | A * | 8/1958 | Nagy | B23K 9/282<br>219/138 |
| 2,873,357 | A * | 2/1959 | Landis | B23K 9/282<br>219/138 |
| 2,885,535 | A * | 5/1959 | Forseth | B23K 9/282<br>219/143 |
| 2,889,447 | A * | 6/1959 | Runkel | B23K 9/282<br>219/141 |
| 2,894,086 | A * | 7/1959 | Rizer | B23K 9/282<br>200/51 R |
| 2,922,027 | A * | 1/1960 | Dumais | B23K 9/282<br>219/138 |
| 2,930,884 | A * | 3/1960 | Monax | B23K 9/282<br>219/138 |
| 2,936,365 | A * | 5/1960 | Niemi | B23K 9/282<br>219/138 |
| 2,954,458 | A * | 9/1960 | Mankouski | B23K 9/282<br>219/138 |
| 2,964,727 | A * | 12/1960 | Hebeler | B23K 9/282<br>439/438 |
| 2,976,396 | A * | 3/1961 | Booher | B23K 9/282<br>219/138 |
| 2,990,468 | A * | 6/1961 | Mankouski | B23K 9/282<br>219/138 |
| 3,045,109 | A * | 7/1962 | Heggy | B23K 9/282<br>219/143 |
| 3,102,827 | A * | 9/1963 | Kriewall | B23K 35/0272<br>148/24 |
| 3,207,885 | A * | 9/1965 | Rieger | B23K 9/122<br>219/137.31 |
| 3,219,793 | A * | 11/1965 | Mahoney | B23K 9/282<br>219/144 |
| 3,356,823 | A * | 12/1967 | Waters | B23K 9/282<br>200/567 |
| 3,493,719 | A * | 2/1970 | Cribb | B23K 9/28<br>219/142 |
| 3,548,918 | A * | 12/1970 | Cerwenka | C22B 9/18<br>164/497 |
| 3,551,638 | A * | 12/1970 | Campbell | B23K 9/1087<br>219/134 |
| 3,597,581 | A * | 8/1971 | Chiche | B23K 9/282<br>219/140 |
| 3,597,583 | A * | 8/1971 | Hulsewig | B23K 35/365<br>219/146.23 |
| 3,620,830 | A * | 11/1971 | Kramer | B23K 35/0272<br>148/24 |
| 3,626,358 | A * | 12/1971 | Klassen | H01R 11/20<br>324/72.5 |
| 3,641,473 | A * | 2/1972 | Attaway | H01R 4/64<br>439/108 |
| 3,648,016 | A * | 3/1972 | Matthews | B23K 9/282<br>219/142 |
| 3,654,421 | A * | 4/1972 | Streetman | B23K 9/28<br>219/70 |
| 3,701,444 | A * | 10/1972 | Clement | B23K 35/0261<br>219/137 R |
| 3,748,434 | A * | 7/1973 | Girard | B23K 35/0294<br>219/126 |
| 3,769,491 | A * | 10/1973 | De Long | B23K 35/365<br>219/137 R |
| 3,779,802 | A * | 12/1973 | Streel | B23K 35/0261<br>428/655 |
| 3,783,234 | A * | 1/1974 | Russell | B23K 35/0272<br>219/145.23 |
| 3,798,412 | A * | 3/1974 | Smith | B23K 35/0261<br>219/136 |
| 3,811,085 | A * | 5/1974 | Saulsman | B23K 9/1056<br>219/132 |
| 3,828,160 | A * | 8/1974 | Greer | B23K 9/282<br>219/138 |
| 3,835,288 | A * | 9/1974 | Henderson | B23K 35/3613<br>219/145.41 |
| 4,071,733 | A * | 1/1978 | Pishioneri | B23K 9/282<br>219/138 |
| 4,153,321 | A * | 5/1979 | Pombrol | H01R 11/24<br>24/518 |
| 4,237,365 | A * | 12/1980 | Lambros | B23K 9/282<br>219/129 |
| 4,258,244 | A * | 3/1981 | Rieppel | B23K 9/013<br>219/69.1 |
| 4,463,482 | A * | 8/1984 | Hawie | A41F 3/02<br>24/489 |
| 4,489,524 | A * | 12/1984 | Watson | B24B 23/005<br>451/344 |
| 4,514,033 | A * | 4/1985 | Matthews | H01R 11/22<br>439/729 |
| 4,588,252 | A * | 5/1986 | Ice | B23K 9/26<br>439/724 |
| 4,591,690 | A * | 5/1986 | Van Reijmersdal | B23K 9/282<br>219/138 |
| 4,844,779 | A * | 7/1989 | Callahan | C25D 17/06<br>204/242 |
| 4,924,065 | A * | 5/1990 | Vito | B23K 9/282<br>219/136 |
| 5,223,686 | A * | 6/1993 | Benway | B23K 9/0286<br>219/125.11 |
| 5,585,022 | A | 12/1996 | Driscoll, Jr. | |
| 5,772,468 | A | 6/1998 | Kowalski et al. | |
| 6,184,492 | B1 * | 2/2001 | Busopulos | B23K 9/282<br>219/138 |
| 6,444,951 | B1 * | 9/2002 | Paxton | B23K 9/282<br>219/136 |
| 7,825,351 | B2 * | 11/2010 | Schneider | B23K 9/28<br>219/138 |
| 7,950,971 | B2 * | 5/2011 | Hobet | A61B 5/0408<br>439/822 |
| 8,083,555 | B2 * | 12/2011 | Schouten | H01R 11/24<br>439/822 |
| 2002/0113049 | A1 * | 8/2002 | Paxton | B23K 9/282<br>219/138 |
| 2006/0086709 | A1 * | 4/2006 | Schneider | B23K 9/282<br>219/138 |
| 2006/0191907 | A1 * | 8/2006 | Henley | B23K 37/006<br>219/617 |
| 2008/0128398 | A1 * | 6/2008 | Schneider | B23K 9/28<br>219/141 |

OTHER PUBLICATIONS

International Preliminary Report on Patentability for PCT Application No. PCT/US2012/020330, filed Jan. 5, 2012 (Publication No. WO2012/094494, published Jul. 12, 2012), issued Jul. 10, 2013 (5 pages).

* cited by examiner

INSULATED ELECTRODE COVER FOR A WELDING ELECTRODE HOLDER

CROSS-REFERENCE TO RELATED APPLICATIONS

This application claims the benefit of U.S. Application No. 61/429,996, filed Jan. 5, 2011; which is hereby incorporated herein by reference in its entirety.

FIELD OF THE INVENTION

The field of this invention relates generally to an insulated electrode cover for a welding electrode holder, and more particularly to an insulated electrode cover that reduces or prevents electrical shock accidents and/or fires while welding when the welding machine is energized.

BACKGROUND OF THE INVENTION

Conventional welding electrode holders for use in welding metals together are formed from a pair of electrically conductive opposing biasable jaws. Each jaw has an exterior surface and an interior surface. A user can manipulate an insulated handle to move the pair of jaws about and between an open position and a closed position. In the closed position, at least portions of the interior surface of the jaws are in contact with each other and at least one welding rod seat is defined therein a portion of the jaws. A consumable electrode rod or stick can be inserted in the welding rod seat and clamped in place by the pair of jaws. Electric current can be discharged through the welding electrode holder and into the welding rod. The electric current is used to strike an arc between the base material and the consumable electrode rod to melt the metals at the welding point.

Because the jaws are electrically conductive, both the exterior surface and the interior surface of each jaw is electrically charged when electric current is flowing through the welding electrode. If a portion of the jaws is inadvertently placed into contact with or even near a metal object while the electrode is energized, a dangerous arc can be created between the electrode holder and the metal object that can shock a person in contact with the metal object. Additionally, fires can be ignited by these arcs.

In view of the preceding, there is a need for an insulated electrode cover to cover exposed, electrically conductive portions of the welding electrode holder to reduce or prevent inadvertent arcing between the electrode holder and nearby objects.

SUMMARY OF THE INVENTION

This application relates to an insulated electrode cover for a welding electrode holder to reduce or eliminate inadvertent electrical arcing between the electrode holder and adjacent objects. In one aspect, the insulated electrode cover can comprise a cap configured to couple to the welding electrode holder. In another aspect, the cap can be positioned on the welding electrode holder to overlie selective portions of the jaws of the welding electrode holder so that, when a welding rod is clamped in the jaws of the electrode holder and the electrode is energized, no electrically conductive portion on the exterior surfaces of the jaws is exposed. This can greatly increase the safety of the welding electrode by reducing or eliminating inadvertent shocks and/or fires that can be created by conventional welding electrode holders.

In one aspect, the cap can be formed from a pair of cap sections, wherein each cap section is configured to be coupled to portions of a respective jaw of the welding electrode holder. A conventional welding electrode holder has at least one welding rod seat defined in the jaws of the electrode holder. The at least one welding rod seat forms a seat profile in the exterior surface of the jaw, and in one aspect, the cap can have a complementary cap profile. When the jaws of the electrode holder are closed, the at least one welding rod seat can define at least one bore in the jaws. In one aspect, at least one arcuate portion can be defined in the electrode cap that is co-axially and complementarily aligned with the at least one welding rod seat. In another aspect, the at least one bore defined in the jaws can have a diameter substantially the same as at least one circular opening that is defined by the arcuate portions in the cap.

In use, in one aspect, a user can insert a welding rod into the welding rod seat, and the jaws of the welding electrode holder can be moved to the closed position. The insulated electrode cover can overlie any exposed electrically conductive exterior surface of the jaws without limiting access of the welder to the welding rod. With the cover in place on the electrode holder, inadvertent contact with the exterior surface of the jaws is reduced or eliminated. Further, with the insulated electrode cover in place and the jaws of the electrode holder in the closed position, no electrically conductive portions of the welding electrode cover are accessible.

BRIEF DESCRIPTION OF THE FIGURES

These and other features of the preferred embodiments of the invention will become more apparent in the detailed description in which reference is made to the appended drawings wherein.

DETAILED DESCRIPTION OF THE INVENTION

The present invention can be understood more readily by reference to the following detailed description, examples, drawing, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof As used throughout, the singular forms "a," "an" and "the" include plural referents unless the context clearly dictates otherwise. Thus, for example, reference to "a cover" can include two or more such covers unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Figure 2:
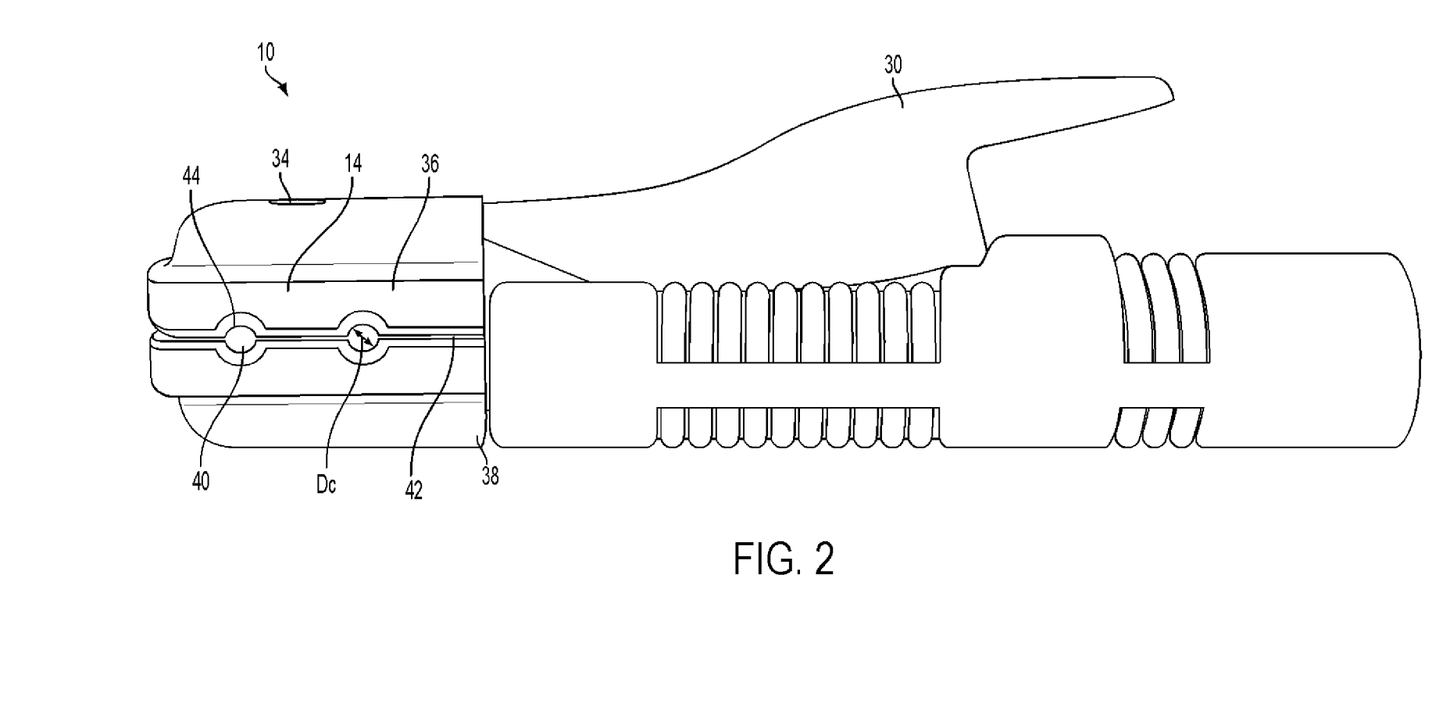
FIG. 2 is a side elevational view of one embodiment of an insulated electrode cover positioned on a welding electrode holder.
Figure 3:
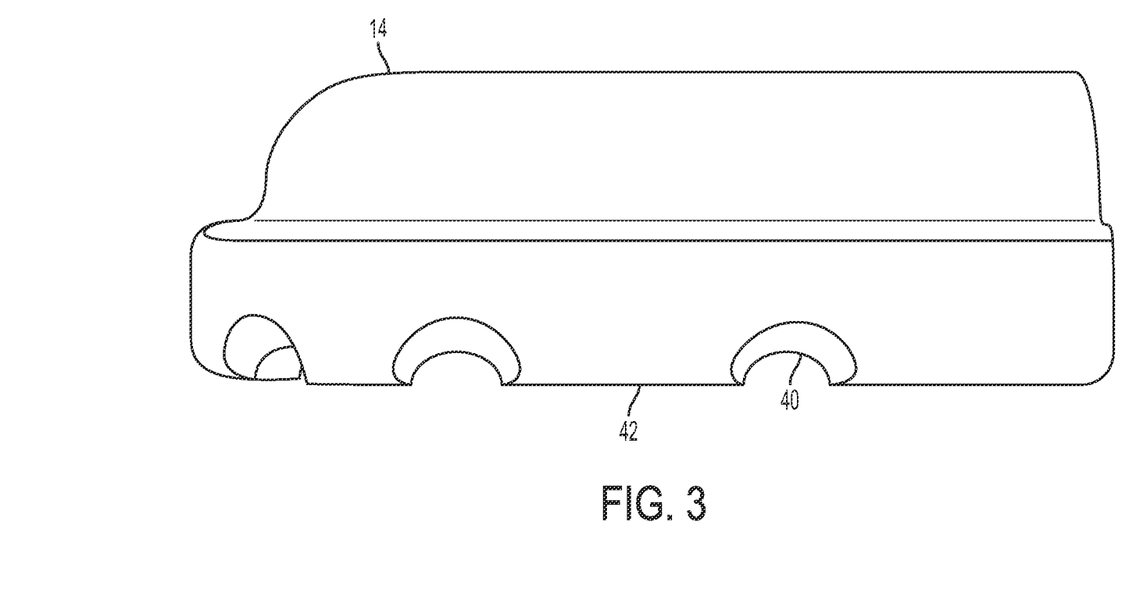
FIG. 3 is a side elevational view of the insulated electrode cover of FIG. 2.
Figure 4:
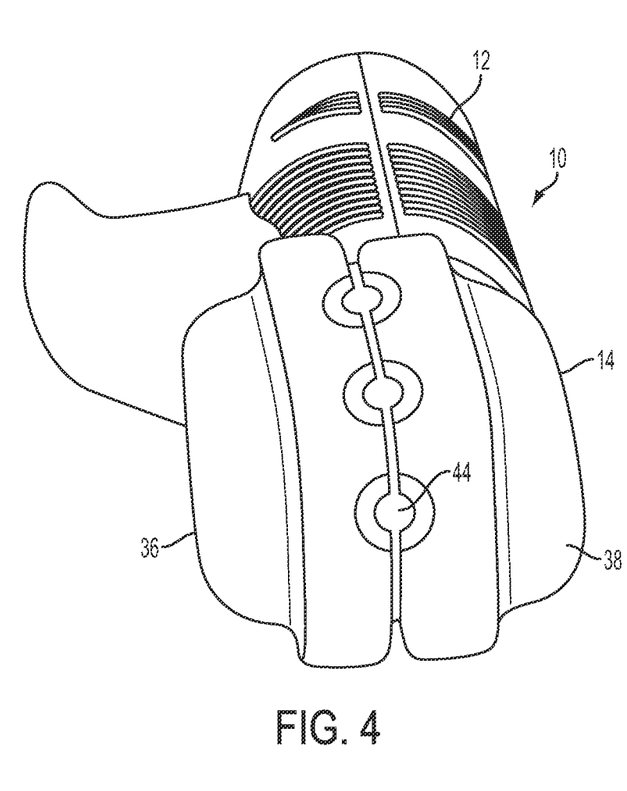
FIG. 4 is a front elevational view of the insulated electrode cover of FIG. 2 positioned on a welding electrode holder.
Figure 5:
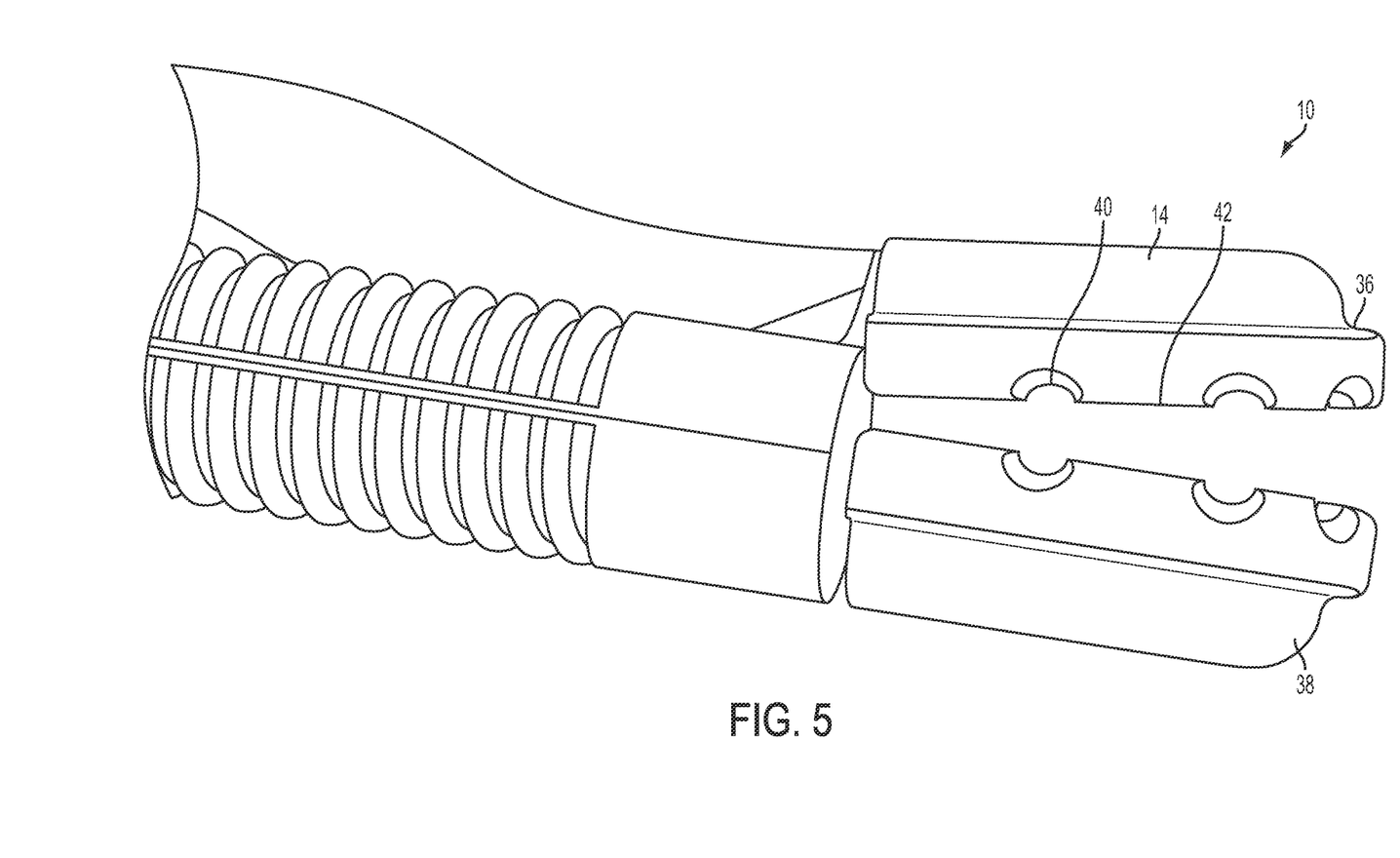
FIG. 5 is a view of one embodiment of an insulated electrode cover positioned on a welding electrode holder, the electrode holder shown in an open position.

An insulated electrode cover 10 for a welding electrode holder 12 is provided, according to various aspects. In one aspect, as illustrated in FIG. 2, the cover can comprise a cap 14 configured to couple to at least a portion of the electrode holder so that electrically conductive portions of the welding electrode holder are not exposed.

Figure 1:
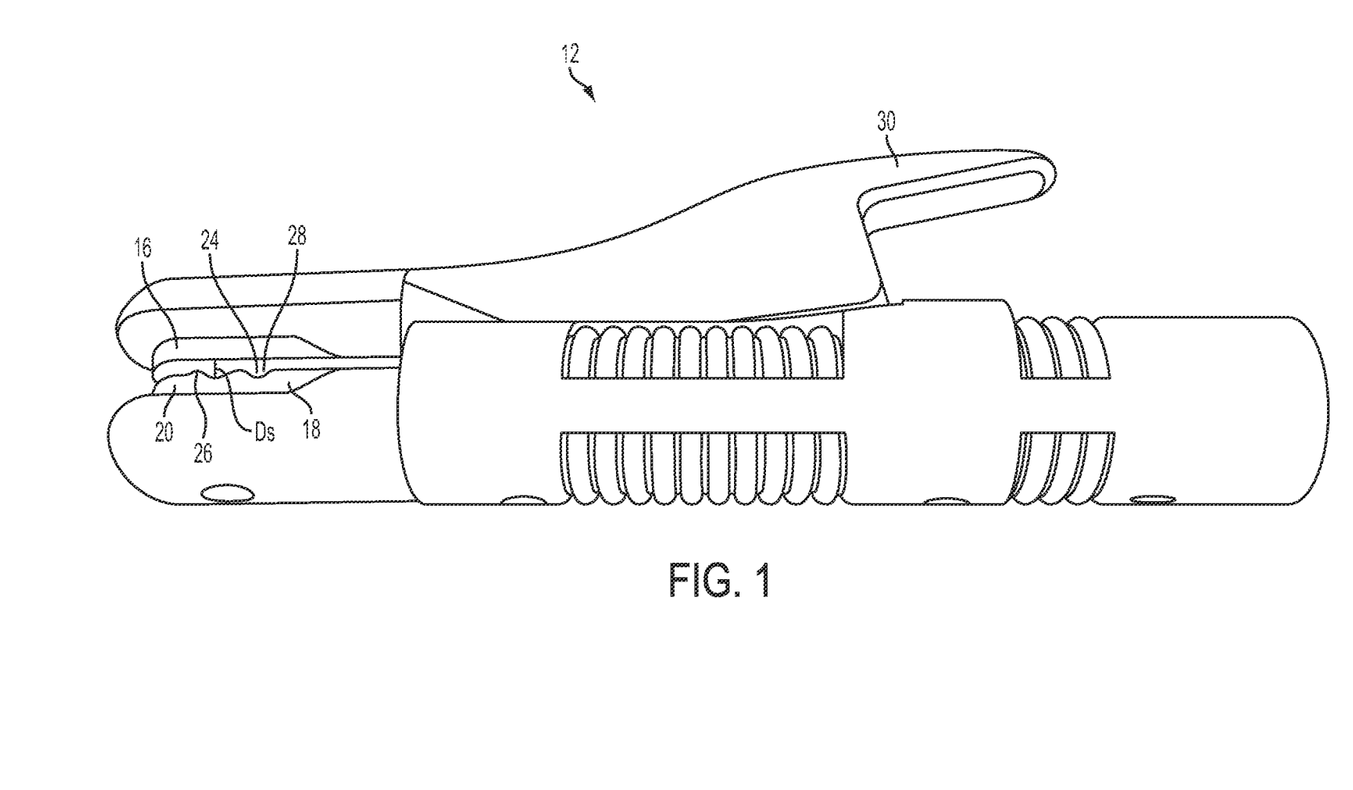
FIG. 1 is a view of a conventional, prior-art welding electrode holder in a closed position.

The welding electrode holder 12 can be a conventional welding electrode holder as known in the art and illustrated in FIG. 1. In one aspect, the welding electrode holder can comprise a pair of electrically conductive opposing biasable jaws 16, 18. Each jaw can have an exterior surface 20 and an interior surface. The pair of jaws can be movable about and between an open position, in which the jaws are spaced a first distance from each other, and a closed position, in which the jaws are spaced a second distance from each other, wherein the second distance is less than the first distance. In one aspect, in the closed position, at least portions of the interior surface of the jaws can be in contact with each other. For example, a peripheral edge 26 of a first jaw 16 can contact the peripheral edge of a second, opposed jaw 18.

In one aspect, the exterior surface 20 of each jaw 16, 18 can face away from the respective jaw, and the interior surface of each jaw can face an opposed interior surface. For example, when viewing the electrode holder in a side elevational view as in FIG. 1, the exterior surface 20 of each jaw is visible. In another example, the peripheral edge 26 of each jaw faces the peripheral edge of the opposed jaw and is an interior surface.

In another aspect, at least one welding rod seat 28 can be defined therein a portion of the jaws 16, 18. The welding rod seat can be sized and shaped such that a welding rod can be inserted into the welding rod seat when the jaws 16, 18 are in the open position, and securely clamped by the jaws when the jaws are biased to the closed position. In another aspect, and still with reference to the side elevational view of FIG. 1, the at least one welding rod seat 28 forms a seat profile in the exterior surface 20 of each jaw. In still another aspect, the seat profile defines a plurality of bores 24 between the peripheral edges 26 of the jaws. In one aspect, when the jaws are in the closed position, the plurality of bores comprise at least one bore defined in the jaws 16, 18 having a seat diameter $D_S$. In another aspect, the seat profile comprises a plurality of semi-circular welding rod seats defined in the peripheral edge of a first jaw 16. The at least one welding rod seat 28 can be defined in locations in the jaws that would conveniently position the welding rod during the welding process.

In one aspect, the at least one welding rod seat 28 can comprise a plurality of welding rod seats. Each welding rod seat of the plurality of welding rod seats can be substantially the same size and shape, or alternatively, at least one welding rod seat can have a different size and/or shape. The plurality of welding rod seats can be defined in locations in the jaws that would be convenient for a welder during the welding process. In another aspect, the plurality of welding rods seats can comprise a first seat positioned at a first angle relative to the longitudinal axis of the welding electrode, and a second seat positioned at a second angle relative to the longitudinal axis of the welding electrode. In another aspect, the second angle can be different than the first angle.

The welding electrode holder 12 can further comprise an insulated handle 30 configured to move the jaws about and between the open position and the closed position. There can be a spring or other biasing means coupled to the handle to urge the welding electrode holder to the closed position.

With reference to FIG. 2, the insulated electrode cover 10 comprises a cap 14 configured to couple to at least a portion of the welding electrode holder 12. In one aspect, the cap can be configured to conform to the shape of the jaws of the electrode holder. As explained more fully below, the cap can be positioned on the jaws 16, 18 to overlie selective portions of the jaws such that, in the closed position, no electrically conductive portion on the exterior surface 20 of the jaws is exposed. In another aspect, when the cap 14 is coupled to the jaws 16, 18 of an electrode holder 12, the cap defines a cap chamber 15 having an interior volume. In this aspect, the cap chamber can be sized so that all electrically conductive portions of the jaws can be positioned and/or encapsulated within the cap chamber.

The cap 14 can be formed from any suitable insulating material known to one of ordinary skill in the art using any conventionally known manufacturing processes, including for example conventionally known injection molding processes. In one aspect, the cap can be formed from a polymeric composition such as nylon and the like. For example, the cap can be formed from a polymeric material such as PPA 4005.3 (polyphthalamide) provided by GlobalTech Plastics of Auburn, WA. In another aspect, the cap 14 can be formed from unsaturated polyester glass fiber reinforced dough molding compound (DMC). In still another aspect, the cap can be formed from fireproof or flame retardant compositions.

In one aspect, the cap 14 can be coupled to the welding electrode holder 12 with a fastener such as, for example and without limitation, a screw. As illustrated in FIG. 2, a fastener bore 34 can be defined in the cap for receiving the fastener. In one aspect, the cap can be coupled to the welding electrode holder with the existing fasteners supplied with the electrode holder. Optionally, the cap 14 can be coupled to the welding electrode holder with adhesives, a friction fit (for example, the cap 14 can snap onto the jaws) and the like. In another aspect, the cap 14 can be releasably attached to the welding electrode holder 12 so that the electrode holder can be used without the cap if desired.

Figure 11:
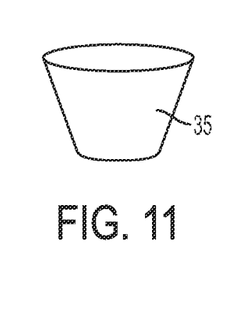
FIG. 11 is a front elevational view of a plug of the insulated electrode cover of FIG. 2.

In one aspect, the cap 14 can comprise a means for restricting access to electrically conductive portions of the welding electrode holder 12 through the fastener bore 34. With reference to FIG. 11, the means for restricting access can comprise a plug 35 formed from a non-conductive material configured to overlie and cover the fastener bore 34 of the cap. For example, the plug can be sized and shaped to couple to the fastener bore to restrict access to a fastener positioned in the fastener bore. In another aspect, the means for restricting access can comprise coupling the cap 14 to the electrode holder with an insulated fastener inserted into the fastener bore 34. In still another aspect, the means for restricting access can comprise coating an exposed portion on the fastener with a non-electrically conductive coating.

Figure 6:
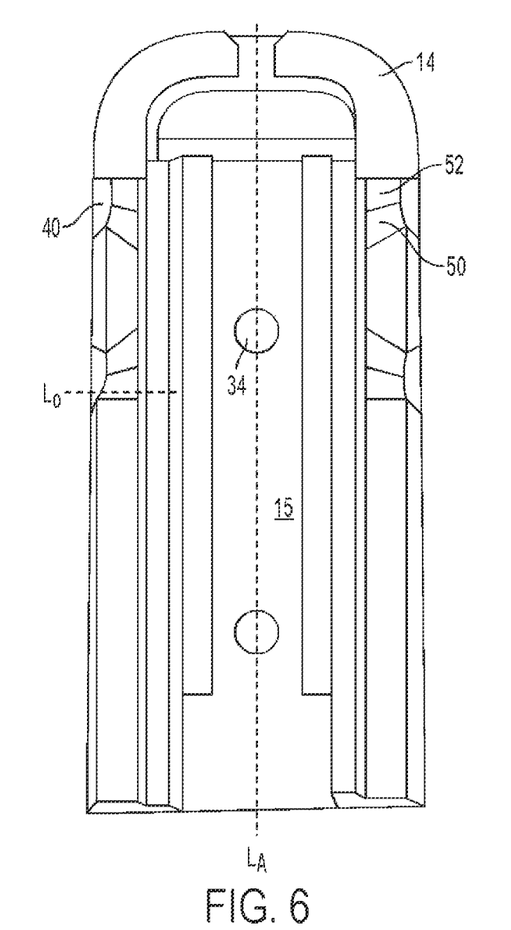
FIG. 6 is a bottom elevational view of an insulated electrode cover, according to one aspect.
Figure 7:
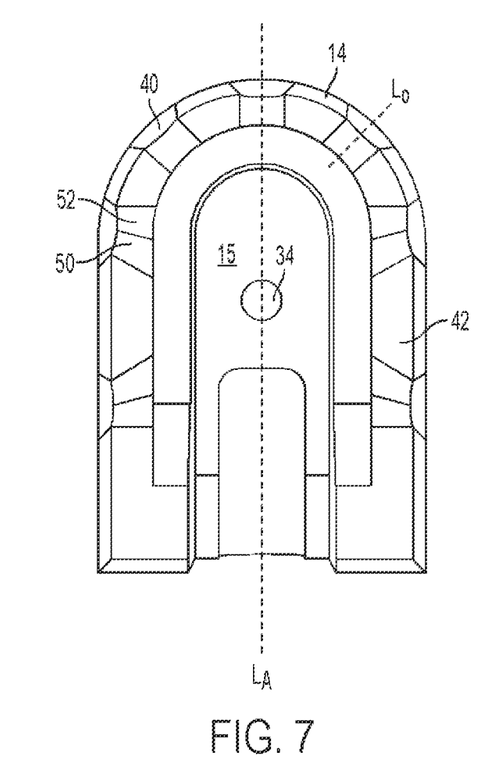
FIG. 7 is a bottom elevational view of the insulated electrode cover of FIG. 2.
Figure 8:
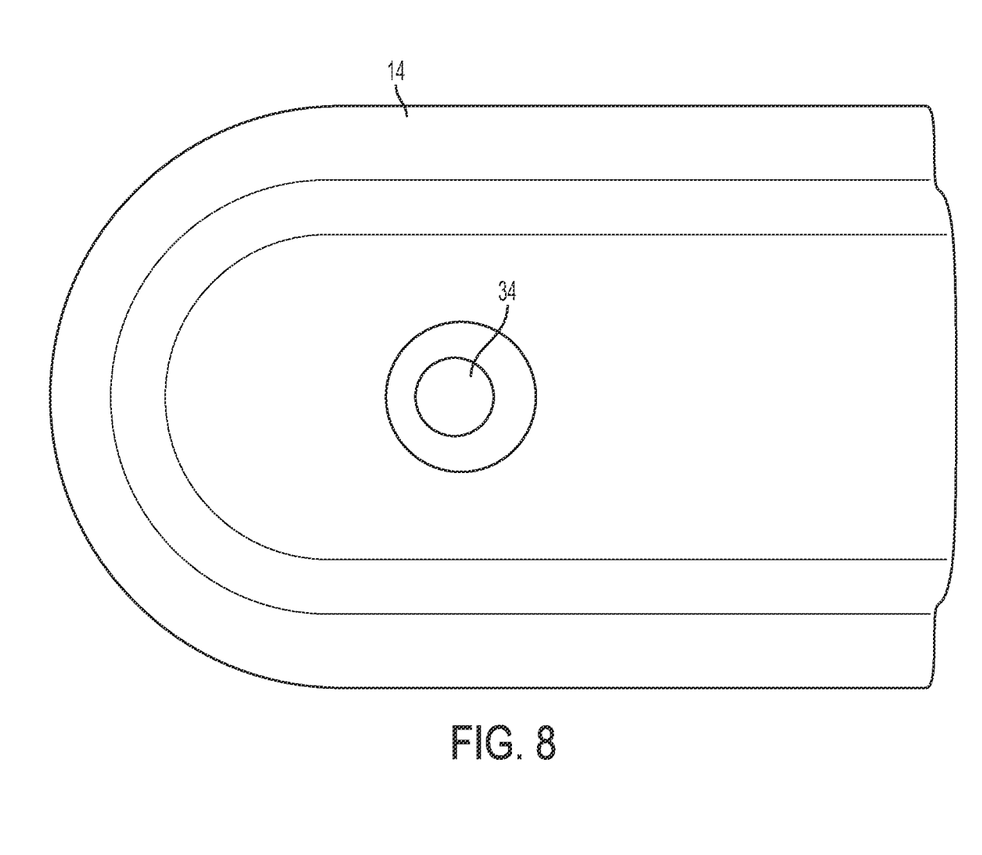
FIG. 8 is a top elevational view of the insulated electrode cover of FIG. 2.
Figure 9:
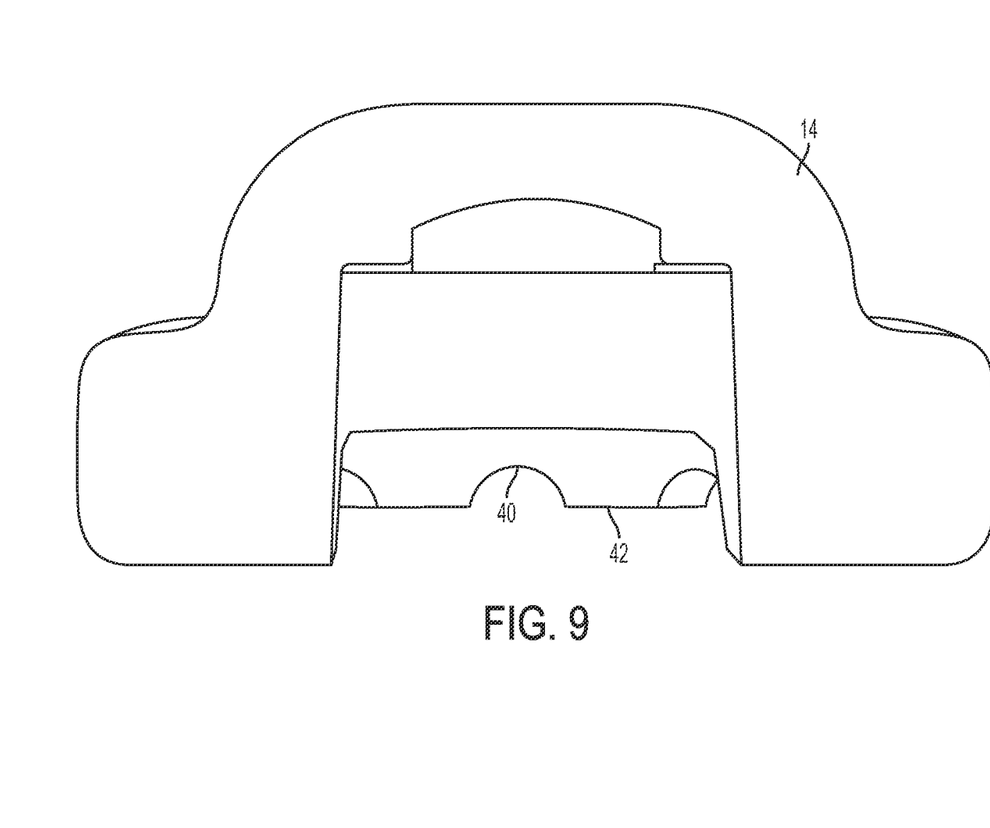
FIG. 9 is a rear elevational view of the insulated electrode cover of FIG. 2.
Figure 10:
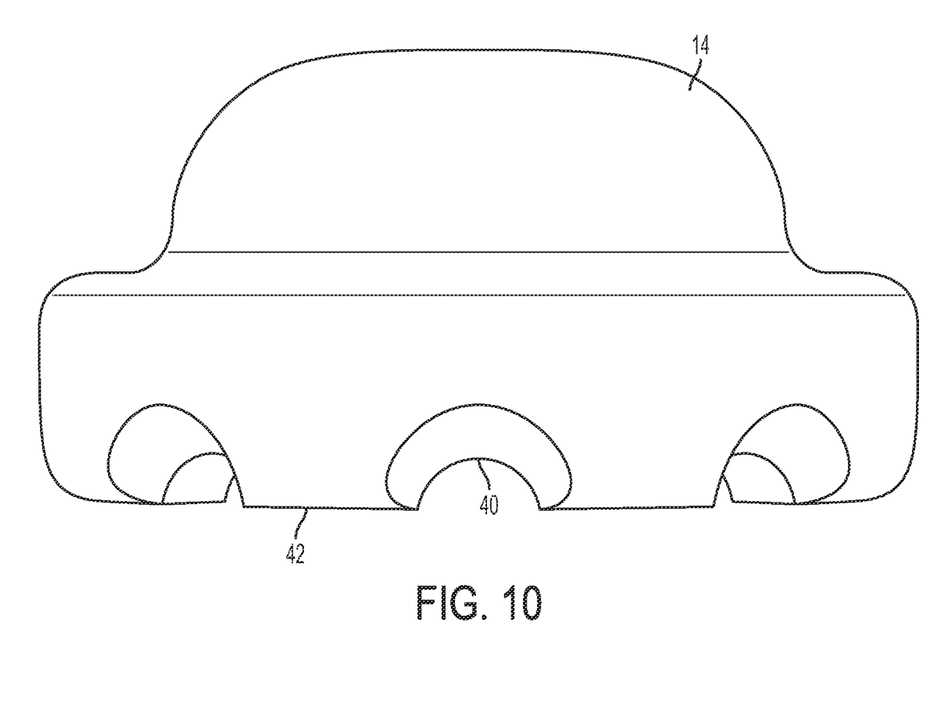
FIG. 10 is a front elevational view of the insulated electrode cover of FIG. 2.

It is contemplated that the cap 14 can be shaped and sized to conform to the shape of any welding electrode holder. For example, in one aspect, the cap 14 can be shaped and sized as illustrated in FIG. 7 to couple the cap to a first style of an electrode holder 12. Optionally, the cap can be shaped and sized as illustrated in FIG. 6 to couple the cap to a second style of an electrode holder.

In one aspect, the cap 14 can comprise a pair of cap sections 36, 38. In this aspect, each cap section can be configured to couple to portions of a respective jaw of the pair of jaws 16, 18 of the welding electrode holder 12. For example, a first cap section 36 can be coupled to the first jaw, and a second cap section 38 can be coupled to the second jaw. Alternatively, in another aspect, the cap sections 36, 38 can be formed integrally with the handle 30 and/or other insulated portions of the electrode holder. In still another aspect, the cap 14 can be formed from a single piece that is flexible and therefore capable of moving between the open and closed position when coupled to the jaws 16, 18 of the electrode holder.

According to one aspect, the cap 14 can have a cap profile, exemplarily illustrated in FIG. 2. In another aspect, the cap profile comprises a plurality of opposed arcuate portions 40 defined in an outer edge 42 of the cap. When coupled to jaws and when the jaws 16, 18 are in the closed position, the plurality of arcuate portions cooperate to define at least one circular opening 44 in the cap 14. In this aspect, the at least one circular opening has a cap diameter $D_C$.

In one aspect, the cap profile can be substantially the same as the seat profile of the jaw. In another aspect, the plurality of arcuate portions 40 can be sized and shaped to correspond to the plurality of arcuate bores 24 of the jaws. Thus, the cap diameter $D_C$ of the at least one circular opening 44 can be substantially the same as the seat diameter $D_S$ of the at least one bore defined in the jaws 16, 18. In yet another aspect, when the jaws are in the closed position, the at least one circular opening 44 in the cap 14 can be co-axially and complementarily aligned with the at least one welding rod seat 28 in the jaws. In one aspect, the cap can have a number of circular openings equal to the number of welding rod seats 28 in the jaws 16, 18 of the electrode holder 12. In another aspect, the circular openings 44 of the cap can be substantially the same diameter as the welding rod seats. Thus, each circular opening of the cap 14 can be substantially the same size and shape, or alternatively, at least one circular opening 44 of the cap can have a different size and/or shape. In another aspect, the circular openings of the cap and the arcuate bores of the jaws, which are defined by the welding rod seats 28, can be coaxially aligned when the cap is coupled to the welding electrode holder 12. In one aspect, the cap diameter $D_C$ can be less than the seat diameter $D_S$. If the cap 14 is formed from a flexible material, such as, for example and without limitation, rubber, when a welding rod is placed into the welding rod seat 28 (and the arcuate bores of the jaws), the welding rod can deform the cap as the jaws 16, 18 of the electrode holder 12 are moved to the closed position.

Figure 12:
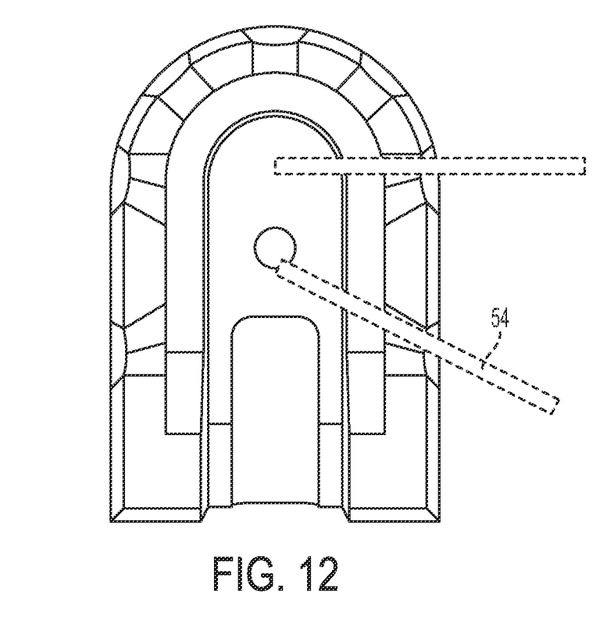
FIG. 12 is a bottom elevational view of the insulated electrode cover of FIG. 2, showing exemplary positions of a plurality of welding rods, according to one aspect.

As illustrated in FIGS. 6 and 7, in one aspect, each arcuate portion 40 of the plurality of arcuate portions can form a portion of a cap seat 50 having a longitudinal axis $L_O$. In another aspect, each cap seat can be sized and shaped to conform to a welding rod. In a further aspect, the plurality of cap seats can be configured to be substantially coaxially aligned with the plurality of welding rod seats of the jaws 16, 18. For example, if a linear welding rod was inserted in a welding rod seat 28 of the jaws, the welding rod could extend through a cap seat. In still another aspect, the plurality of cap seats can comprise a first cap seat 50 positioned at a first angle relative to the longitudinal axis $L_A$ of the cap, and a second cap seat 52 positioned at a second angle relative to the longitudinal axis of the cap. In another aspect, the second angle can be different than the first angle. In still another aspect, at least a portion of the first cap seat can overlie the second cap seat. In this aspect, and with reference to FIG. 12, a welding rod 54 positioned in a welding rod seat of the jaws could extend through an arcuate portion 40 (and circular opening 44) of the cap at a different angle relative to the longitudinal axis $L_A$ of the cap and the welding electrode, depending upon in which cap seat 50, 52 the welding rod was positioned.

In order to assemble an insulated welding electrode holder 12, the cap 14 can be positioned on the jaws 16, 18 to overlie selective portions of the jaws such that, in the closed position, no electrically conductive portion on the exterior surface 20 of the jaws is exposed. As can be seen in the side elevational view FIG. 2, in one aspect, the cap sections overlie the exposed exterior surface 20 of the jaws, and no exterior surface of the jaws is visible or accessible. The cap 14 can then be coupled to the welding electrode holder. For example, a first cap section 36 can be attached with a fastener to the first jaw, and a second cap section can be attached with a fastener to the second jaw. The means for restricting access to electrically conductive portions of the welding electrode holder 12 through the fastener bore 34 can prevent exposure of electrically conductive portions of the electrode holder. For example, the cap plug 35 can be inserted into the fastener bore to overlie the fastener and restrict access to the fastener and/or electrically conductive portions of the welding electrode holder 12.

Alternatively, the cap 14 can be integrally formed with the electrode holder 12 such that the cap is made from and connected to the handle 30 and/or other insulated portions of the electrode holder. Thus, in one aspect, the cap 14 can be retrofit onto a conventional welding electrode holder to overlie selective portions of the jaws 16, 18, or in another aspect, the cap can be formed integrally with the assembly of a new welding electrode holder.

After being assembled, with the cap 14 positioned on the jaws 16, 18 of the electrode holder 12, all electrically conductive portions of the jaws can be contained within the interior chamber 15 defined in the cap. In one aspect, and as illustrated in FIG. 2, the cap surrounds the electrically conductive portions of the jaws so that all electrically conductive portions of the jaws 16, 18 can be positioned within and/or encapsulated by the cap 14. With the jaws in the closed position, the jaws can be covered except for portions of the jaws accessible through the arcuate portions 40 (and central openings 44) defined in the outer edge 42 of the cap. Thus, no portion of the electrically conductive portion on the exterior surfaces of the jaws is exposed.

In use, a welder can move the jaws 16, 18 of the electrode holder 12 to the open position and insert a welding rod into a selected welding seat 28 of the at least one welding seat in the jaws. In this position, the welding rod contacts an interior surface of the jaws. The jaws 16, 18 can be moved or biased to the closed position, securely clamping the welding rod in place. In the closed position, the outer edge 42 of the cap sections 36, 38 can be placed in contact with or adjacent to each other, thereby restricting access to the underlying exterior surface of the jaws. Also, because the diameter $D_C$ of the opening 44 of the cap 14 can be substantially the same as the diameter $D_S$ of the bore 24 of the jaws (and/or the diameter of the welding rod), the cap can restrict access to the underlying exterior surface 20 of the jaws 16, 18 in the areas proximate the welding rod. With the cap in place on the jaws of the electrode holder 12, there are no exposed electrically conductive surfaces on the electrode holder. With the welding electrode holder energized as would occur during use, the only exposed electrically conductive surface would be the welding rod. If the electrode holder 12 with the insulating cover 10 is energized without a welding rod in place, access to electrically conductive portions of the electrode holder is restricted, thereby greatly increasing the safety of the electrode holder.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An insulated electrode cover for a welding electrode holder having a pair of electrically conductive opposing biasable jaws moveable between an open and a closed position and having respective interior and exterior surfaces, the insulated electrode cover comprising:
a cap comprising first and second opposed cap sections having respective outer edges and being configured to couple to at least a portion of the welding electrode holder, wherein the first cap section is configured to overlie corresponding portions of a first jaw of the welding electrode holder, wherein the second cap section is configured to overlie corresponding portions of a second jaw of the welding electrode holder, wherein the first and second cap sections overlie the respective first and second jaws of the welding electrode holder such that the first and second cap sections are also moveable between the open and closed position,
wherein the outer edges of the first and second cap sections define respective cap profiles, wherein the cap profiles of the first and second cap sections each comprise a plurality of arcuate portions, wherein, when the jaws are in the closed position, the plurality of arcuate portions of the cap profiles of the first and second cap sections cooperate to define at least one circular opening and, when the welding electrode holder is in a closed position, no electrically conductive portion on exterior surfaces of the jaws is visible or accessible through the at least one circular opening.

2. An insulated welding electrode holder comprising:
opposing first and second electrically conductive biasable jaws, wherein each jaw has an exterior surface and an interior surface, wherein the first and second jaws are movable about and between an open position, in which the jaws are spaced a first distance from each other, and a closed position, in which at least portions of the interior surface of the jaws are in contact with each other;
an insulated handle configured to move the jaws about and between the open position and the closed position;
an insulated electrode cap having opposed first and second cap sections, wherein the first and second cap sections have respective outer edges, wherein the first cap section overlies corresponding portions of the first jaw, wherein the second cap section overlies corresponding portions of the second jaw, wherein the first and second cap sections overlie the first and second jaws such that the first and second cap sections are also moveable between the open and closed position;
wherein at least one welding rod seat is defined therein a portion of each of the first and second jaws, wherein the at least one welding rod seat forms a seat profile in the exterior surface of the jaw, wherein the outer edges of the first and second cap sections define respective cap profiles of the first and second cap sections; and
wherein the cap profiles of the first and second cap sections each comprise a plurality of arcuate portions wherein, in the closed position, the plurality of arcuate portions of the cap profiles of the first and second cap sections cooperate to define a plurality of circular openings and, when in the closed position, no electrically conductive portion on the exterior surfaces of the jaws is accessible or visible through the plurality of circular openings.

3. The welding electrode holder of claim 2, wherein, in the closed position, the welding rod seats of the first and second jaws cooperate to define at least one bore and wherein at least one circular opening of the plurality of circular openings defined by the first and second cap sections is co-axially and complementarily aligned with the at least one bore defined by the first and second jaws.

4. The welding electrode holder of claim 3, wherein the at least one bore defined by the first and second jaws has a diameter the same as a diameter of at least one circular opening in the cap.

5. The welding electrode holder of claim 2, wherein each arcuate portion of the plurality of opposed arcuate portions forms a portion of a cap seat having a longitudinal axis.

6. The welding electrode holder of claim 5, wherein the plurality of cap seats comprise a first cap seat positioned at a first angle relative to a longitudinal axis of the welding electrode, and a second cap seat positioned at a second angle relative to the longitudinal axis of the welding electrode.

7. The welding electrode holder of claim 6, wherein the second angle is different than the first angle.

8. The welding electrode holder of claim 3, wherein at least one circular opening in the cap has a diameter that is less than a diameter of at least one bore defined by the first and second jaws.

9. A welding electrode holder comprising:
   first and second electrically conductive opposing biasable d exterior surfaces and welding rod-engaging surfaces extending between the interior and jaws moveable between an open position and a closed position and having respective interior anexterior surfaces, the welding rod-engaging surfaces of the first and second jaws cooperating to form a plurality of welding rod seats; and
   a cap comprising first and second opposed cap sections configured to couple to at least a portion of the welding electrode holder, wherein a plurality of arcuate portions are defined in each outer edge of the first and second opposed cap sections, wherein each arcuate portion of the plurality of arcuate portions forms a portion of a respective cap seat having a longitudinal axis, wherein the cap defines a cap chamber having an interior volume, and wherein, when the cap is coupled to the electrode holder, the first cap section overlies corresponding portions of the first jaw of the welding electrode holder, the second cap section overlies corresponding portions of the second jaw of the welding electrode holder, the first and second cap sections are moveable between the open and closed position, the cap chamber receives all electrically conductive portions of the jaws, and at least one cap seat is positioned in co-axial and complementary alignment with at least one welding rod seat of the jaws, wherein with the first and second jaws of the welding electrode holder in a closed position, the plurality of arcuate portions of the first and second cap sections cooperate to define a plurality of circular openings and, when in the closed position, no electrically conductive portion on the exterior surfaces of the jaws is accessible or visible through the plurality of circular openings.

10. The welding electrode holder of claim 9, wherein the plurality of cap seats comprise at least a first cap seat positioned at a first angle relative to a longitudinal axis of the cap, and a second cap seat positioned at a second angle relative to the longitudinal axis of the cap, and wherein the second angle is different than the first angle.

11. The welding electrode holder of claim 9, wherein, with the first and second jaws in the closed position, the welding rod-engaging surfaces of the first and second jaws are only accessible through the at least one cap seat.

* * * * *